(12) United States Patent
Zhong et al.

(10) Patent No.: US 6,619,430 B2
(45) Date of Patent: Sep. 16, 2003

(54) REFRIGERANT GAS BUFFERED SEAL SYSTEM

(75) Inventors: Jianping Zhong, Michigan City, IN (US); Vishnu Sishtla, Cicero, NY (US)

(73) Assignee: Carrier Corporation, Farmington, CT (US)

( * ) Notice: Subject to any disclaimer, the term of this patent is extended or adjusted under 35 U.S.C. 154(b) by 141 days.

(21) Appl. No.: 09/975,333

(22) Filed: Oct. 12, 2001

(65) Prior Publication Data

US 2003/0070878 A1 Apr. 17, 2003

(51) Int. Cl.⁷ .................................................. F01M 1/00
(52) U.S. Cl. ........................ 184/6.16; 384/479; 277/457
(58) Field of Search ........................... 184/6.16; 415/88; 384/479, 478; 277/303, 412, 387, 457

(56) References Cited

U.S. PATENT DOCUMENTS

| 4,375,156 A | * | 3/1983 | Shaw ........................... 62/468 |
| 5,085,443 A | * | 2/1992 | Richards ...................... 277/412 |
| 6,070,881 A | * | 6/2000 | Longree ....................... 277/409 |
| 6,186,758 B1 | * | 2/2001 | Shaw ........................... 418/203 |
| 6,330,790 B1 | * | 12/2001 | Arora et al. ................ 60/39.08 |
| 6,443,711 B1 | * | 9/2002 | Miller, Jr. ................... 417/372 |
| 2003/0047881 A1 | * | 3/2003 | Worm et al. ................. 277/628 |

* cited by examiner

*Primary Examiner*—David Fenstermacher

(57) ABSTRACT

Refrigerant gas at a few psi higher than suction is supplied via labyrinth or annular groove type seals located between the suction side bearings and suction and between the suction side motor bearing and the motor. The buffer gas flow divides with part going to suction and part to a drain along the oil flowing from the bearings.

5 Claims, 4 Drawing Sheets

REFRIGERANT GAS BUFFERED SEAL SYSTEM

BACKGROUND OF THE INVENTION

There is an affinity between refrigerants and lubricants such that oil is normally present in the refrigerant circulating in a refrigeration system. In screw compressors, the oil entrained in the refrigerant helps to seal the rotors. In other parts of a refrigeration system, the oil interferes with heat transfer by coating the heat transfer surfaces. In addition to the oil present in the suction gas, oil supplied to lubricate the bearings may leak into the suction gas since oil supplied to the inlet side bearings must be at a pressure greater than suction pressure. Excess oil reduces compressor efficiency. If, for example an initial volume of 1000 cc is to be reduced to 200 cc, a 5:1 compression ratio, the presence of 10 cc of oil will result in 990 cc of refrigerant being reduced to 190 cc, a 5.2:1 compression ratio. Thus a reduced volume of refrigerant will be compressed to an excess pressure. Additionally, an oil separator will be required immediately downstream of the compressor to prevent excess oil circulation or a still will be required to remove and recover excess oil. Where an oil separator is used, a larger unit will be required due to the inlet bearing lubricant flowing into the suction flow.

SUMMARY OF THE INVENTION

The present invention has an inlet bearing lubrication system which is isolated from the refrigerant flow through the compressor. During the compression process, the pressure of the trapped volume of refrigerant gas goes from suction to discharge. Accordingly, controlled amounts of gas can be diverted from the trapped volumes over a range of pressures. According to the teachings of the present invention, buffer gas is drawn off from the trapped volumes at a pressure just a few psi higher than the suction pressure. The buffer gas is directed to labyrinth seals at locations between the suction side rotor bearings and suction and between the suction side motor bearings and the motor. The buffer gas flows divide with part going to suction and part to a drain to the oil sump along with the oil flowing from the bearings. The buffer gas flow at the motor side labyrinth seal divides with part going to a drain to the oil sump and part going to the motor chamber which is at suction. Since the buffer gas is just a few psi higher than the compressor suction pressure, there is a minimal impact on the compressor capacity and efficiency.

It is an object of this invention to eliminate, or at least reduce the size of, oil separators or stills in screw compressor refrigeration systems.

It is another object of this invention to provide a separate inlet bearing lubrication system. These objects, and others as will become apparent hereinafter, are accomplished by the present invention.

Basically, refrigerant gas at a few psi higher than suction is supplied via labyrinth or annular groove type seals located between the suction side bearings and suction and between the suction side motor bearing and the motor. The buffer gas flow divides with part going to suction and part to a drain along the oil flowing from the bearings.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
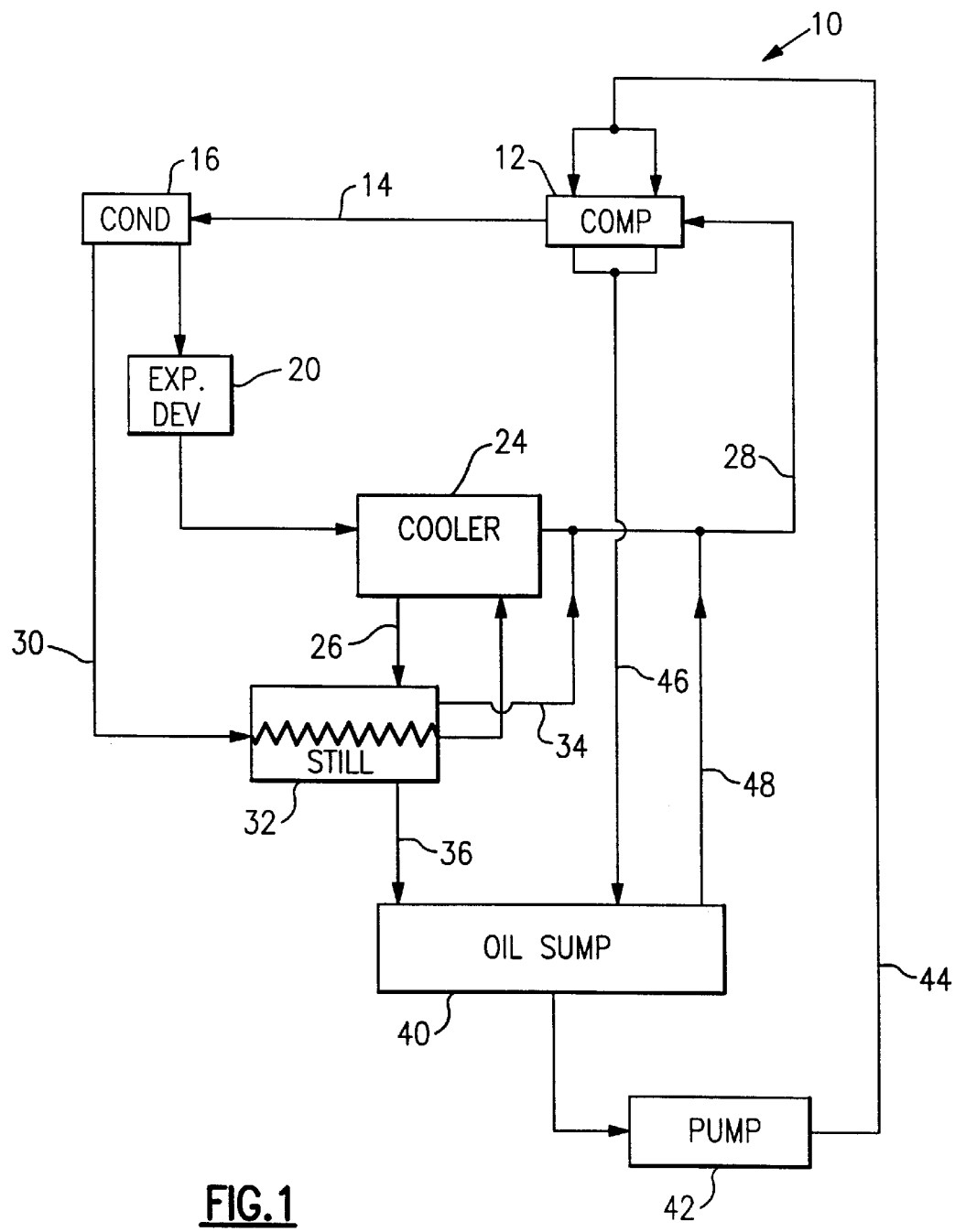
FIG. 1 is a schematic representation of a lubrication system of a refrigeration system where a still is employed.
Figure 2:
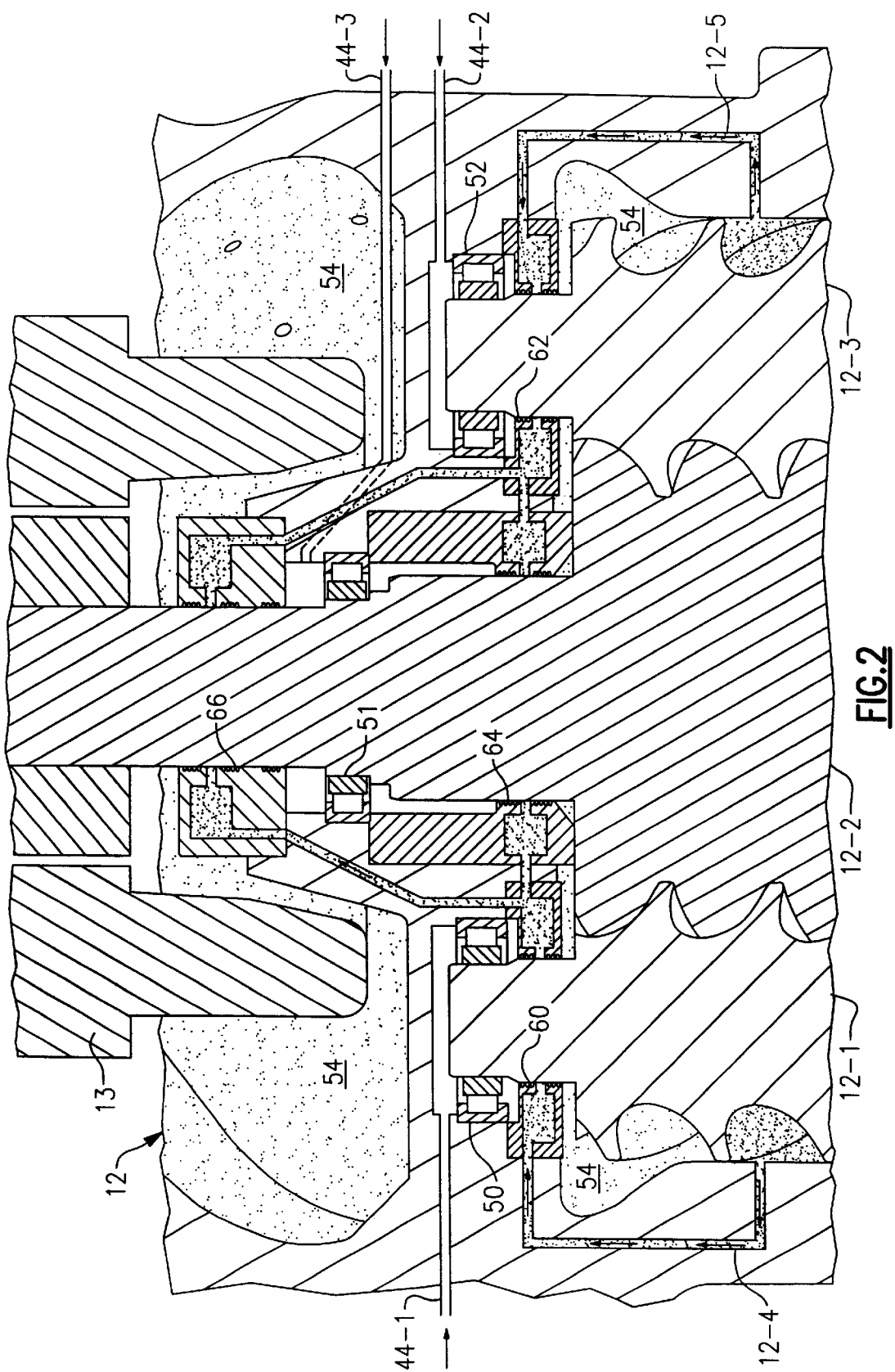
FIG. 2 is a partial sectioned view of the inlet portion of a tri-rotor screw compressor employing the present invention.

In FIG. 1, the numeral 10 generally designates a refrigeration system. Refrigeration system 10 includes a screw compressor 12 having a plurality of rotors 12-1, 12-2 and 12-3 which are supported at their ends by a plurality of roller bearings, as best shown in FIG. 2. Refrigeration system 10 includes a refrigerant circuit serially including screw compressor 12, discharge line 14, condenser 16, expansion device 20, cooler or evaporator 24 and suction line 28. Branch line 30 extends from condenser 16 to cooler 24 via still 32 where heat from the refrigerant flowing in line 30 separates an oil-refrigerant mixture flowing into still 32 via line 26 from cooler 24. The heating separates the mixture with refrigerant flowing via line 34 from still 32 to suction line 28 and oil draining from still 32 via line 36 into oil sump 40. System 10 uses still 32 to achieve oil separation rather than an oil separator located immediately downstream of compressor 12. Oil sump 40 is at suction pressure and oil pump 42 delivers oil from sump 40 to line 44 at a pressure on the order of twenty to twenty five psi above suction pressure. Line 44 branches and/or supplies a plurality of passages in compressor 12 such that the inlet and discharge side bearings are lubricated. Excess oil drains from compressor 12 via line 46 back to sump 40. Since the oil supplied to the inlet bearings is at a pressure greater than suction, there is a tendency for the oil supplied to the inlet bearings to leak into the suction chamber and to be entrained with the refrigerant being compressed by the compressor. A portion of the refrigerant with the entrained oil serially passes through discharge line 14, condenser 16 and line 30 into still 32. In still 32, by heating and/or flashing, the oil is separated from the refrigerant and drains via line 36 into sump 40. The present invention permits the elimination, or at least a size reduction, of still 32 and its associated lines and connections without requiring an oil separator by isolating the bearing lubrication system from the refrigerant circuit.

Referring specifically to FIG. 2, rotors 12-1 and 12-3 are female rotors and rotor 12-2 is a male rotor which is driven by motor 13 and, in turn, drives rotors 12-1 and 12-3. The suction or inlet ends of rotors 12-1, 12-2 and 12-3 are supported by bearings 50, 51 and 52, respectively. Bearings 50, 51 and 52 require lubrication which is supplied from oil sump 40 via line 44 and its branches 44-1, 44-2 and 44-3, respectively, at a pressure of twenty to twenty five psi above suction. All of the spaces indicated by the numeral 54 are at suction pressure and, absent the structure of the present invention, the oil supplied to lubricate bearings 50, 51 and 52 would drain into the regions at suction pressure. According to the teachings of the present invention, seals 60 and 62 which are represented as labyrinth seals are respectively located between bearings 50 and 52 and corresponding regions at suction pressure. Bearing 51 is located between two regions at suction pressure. Seal 64, which is t0 represented as a labyrinth seal, is located between bearing 51 and one region at suction pressure. Seal 66, which is represented as a labyrinth seal, is located between bearing 51 and a second region at suction pressure which is the chamber in which motor 13 is located. As shown in FIG. 2, refrigerant at a pressure twenty to thirty pounds above suction pressure is diverted from trapped volumes via passages 12-4 and 12-5 to seals 60 and 62, respectively, to act as a buffer gas. Stippling has been added to unhatched structure to indicate areas at suction and buffer gas pressures with the greater density of stippling corresponding to buffer gas pressure.

Figure 3:
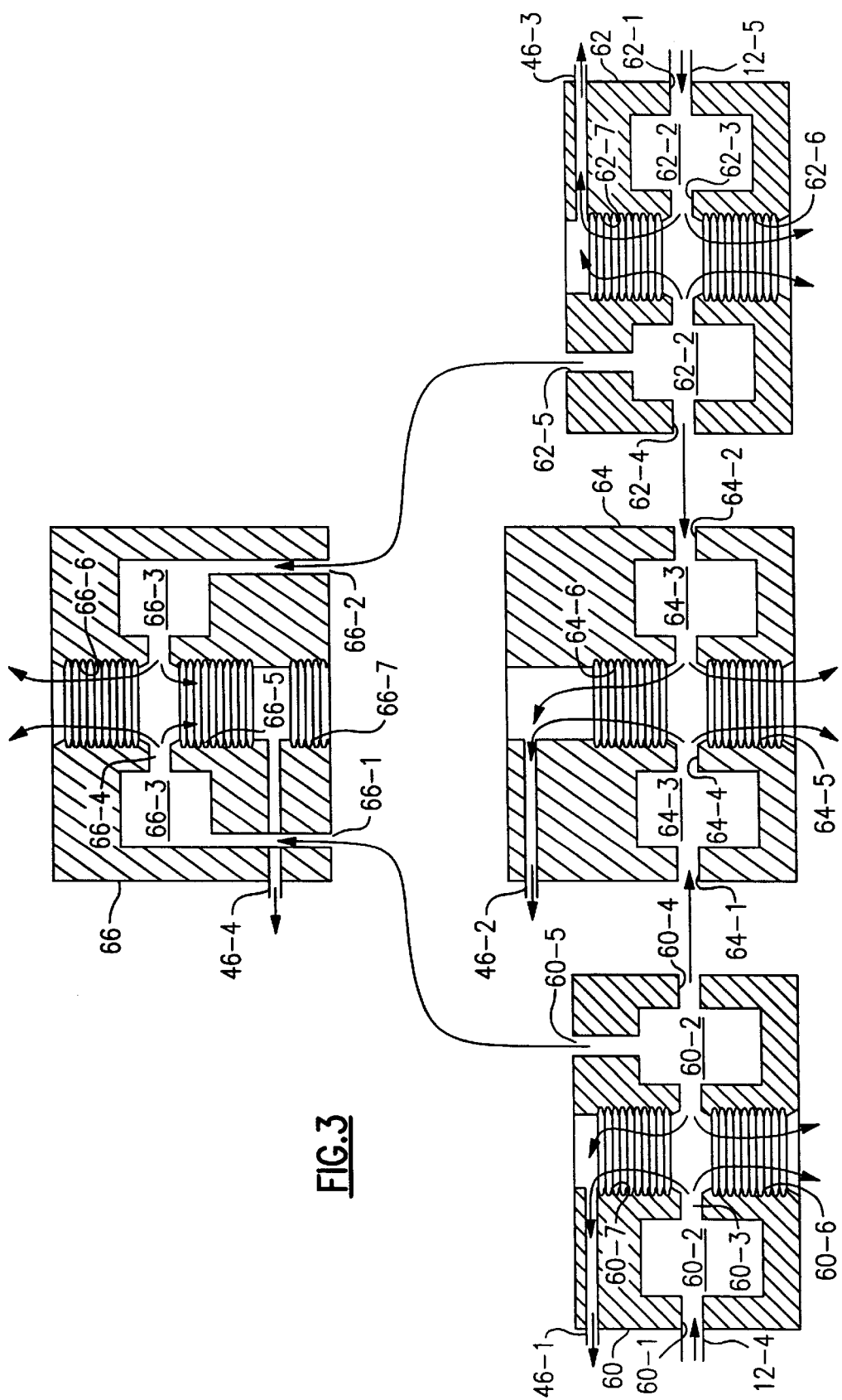
FIG. 3 is a sectional view of the inlet seal structure of FIG. 2 together with their fluid connections.

Referring specifically to FIG. 3, the flow paths for the buffer gas are shown relative to seals 60, 62, 64 and 66. Seal 60 is supplied with buffer gas via passage 12-4 which is fluidly connected to radial passage 60-1 in seal 60. Passage 60-1 extends radially inward to annular chamber 60-2. Flow from annular chamber 60-2 is (1) radially inward via ports/annular slots 60-3, (2) radially outward via passage 60-4, or (3) axially via passage 60-5. The flow via ports/annular slots 60-3 is between labyrinth seals 60-6 and 60-7 such that a portion of the flow passes over labyrinth seal 60-6 and flows into suction. A second portion of the flow passes over labyrinth 60-7 and flows into drain 46-1 where it combines with oil flowing from bearing 50. The flow through passage 60-4 together with flow through passage 62-4 are supplied via radial passages 64-1 and 64-2, respectively, into annular chamber 64-3. The flow from annular chamber 64-3 is radially inward via ports/annular slots 64-4. The flow via ports/annular slots 64-4 is between labyrinth seals 64-5 and 64-6 such that a portion of the flow passes over labyrinth seal 64-5 and flows into suction. A second portion of the flow passes over labyrinth 64-6 and flows into drain 46-2 where it combines with oil flowing from bearing 51.

Seal 62 is identical to seal 60 and is supplied with buffer gas via passage 12-5 which is fluidly connected to radial passage 62-1 in seal 62. Passage 62-1 extends radially inward to annular chamber 62-2. The flow from annular chamber 62-2 is (1) radially inward via ports/annular slots 62-3, (2) radially outward via passage 62-4 to seal 64, as noted above, or (3) axially via passage 62-5. The flow via port/annular slots 62-3 is between labyrinth seals 62-6 and 62-7 such that a portion of the flow passes over labyrinth seal 62-6 and flows into suction. A second portion of the flow passes over labyrinth seal 62-7 and flows into drain 46-3 where it combines with oil flowing from bearing 52.

The flows through axially extending passages 60-5 and 62-5 flow via passages 66-1 and 66-2, respectively, into annular chamber 66-3 of seal 66. The flow from annular chamber 66-3 is radially inward via ports/annular slots 66-4. The flow via port/annular slots 66-4 is between labyrinth seals 66-5 and 66-6 such that a portion of the flow passes over labyrinth seal 66-5 and flows into drain 46-4 where it combines with oil flowing from bearing 51. A second portion of the flow passes over labyrinth seal 66-6 and flows into the motor chamber which is at suction. Labyrinth seal 66-7 is located on the opposite side of drain 46-4 from labyrinth seal 66-5 and serves to prevent the flow of oil supplied to bearing 51 from flowing unrestricted into drain 46-4 rather than passing through bearing 51.

Figure 4:
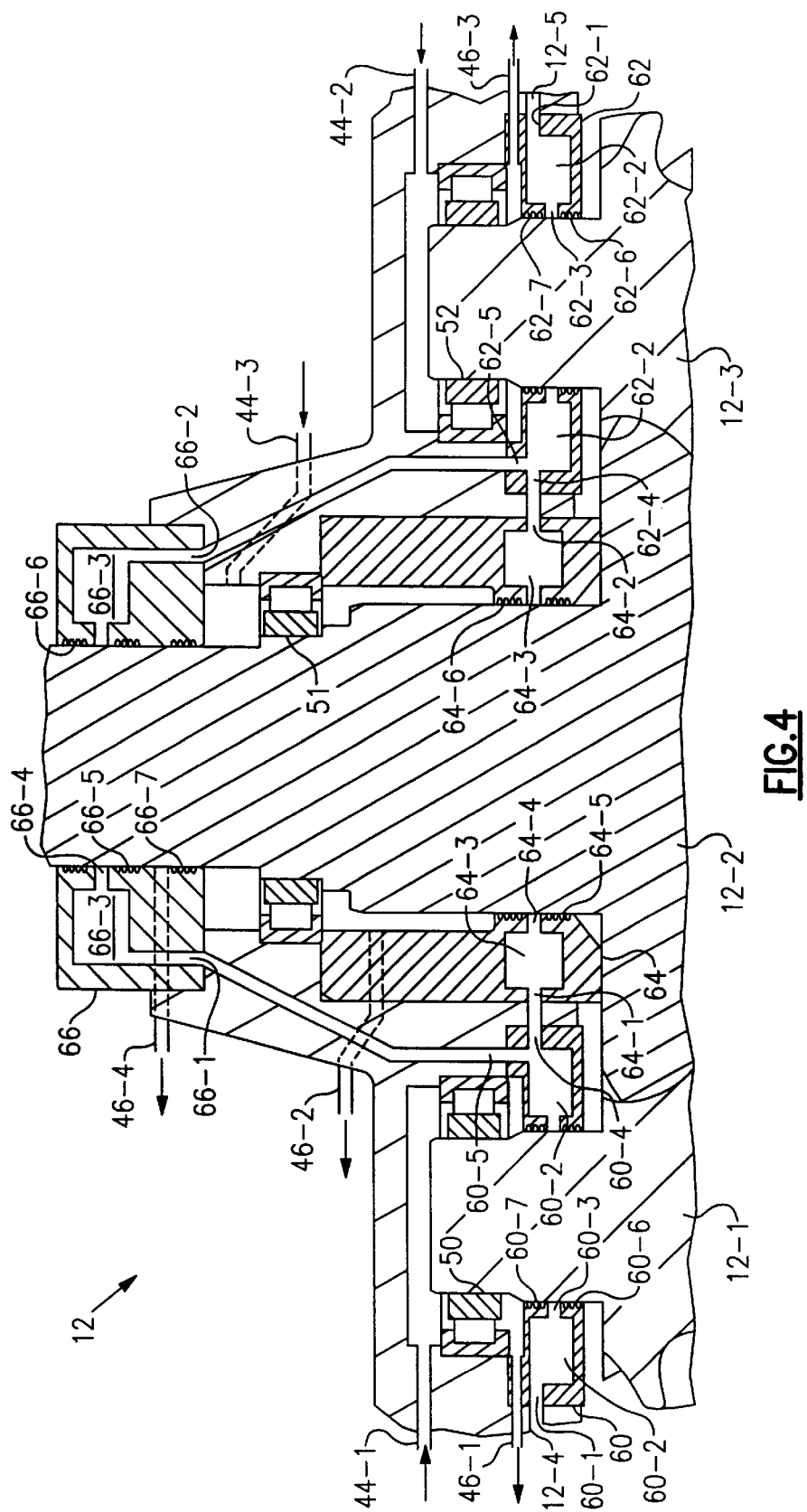
FIG. 4 shows a sectional view of a portion of the FIG. 3 structure with the addition of drain structure.

FIG. 4 adds rotors 12-1, 12-2 and 12-3 as well as the bearings 50, 51 and 52 and their oil supply structure to the structure illustrated in FIG. 3. Only the oil supply and drain flows are indicated by arrows. As is clear from FIG. 4, lubricant supplied via line 44-1 flows through bearing 50 and combines with the buffer gas flowing over labyrinth seal 60-7 in drain line 46-1 which is at suction pressure. Lubricant supplied via line 44-2 flows through bearing 52 and combines with the buffer gas flowing over labyrinth seal 62-7 in drain line 46-3 which is at suction pressure. Lubricant supplied via line 44-3 to lubricate bearing 51 has two possible paths to drain. The first path is through bearing 51 to drain 46-2 where the lubricant combines with buffer gas flowing over labyrinth 64-6. The second path is over labyrinth seal 66-7 to drain 46-4 where the oil combines with buffer gas flowing over labyrinth 66-5. Drains 46-1, 46-2 and 46-3 and 46-4 combine to form line 46. Although both oil and gaseous refrigerant are flowing to oil sump 40 via line 46, the refrigerant gas remains separated beyond the natural affinity and is drawn off from oil sump 40 via line 48 which feeds into suction line 28.

In the drawings, the fluid paths for the lubricant and buffer gas were chosen to provide the clearest understanding of the present invention. Accordingly, as necessary, or desired, internal or external paths, or a combination thereof may be employed. For example, passages 12-4 and 12-5 may be from an external source of pressure as where a constant buffer pressure is desired.

Although a preferred embodiment of the present invention has been illustrated an described, other changes will occur to those skilled in the art. It is therefore intended that the scope of the present invention is to be limited only by the scope of the appended claims.

What is claimed is:

1. A lubrication system for a screw compressor having a plurality of rotors with each of said rotors having an inlet end supported by a bearing comprising:
    means for providing lubricant at a pressure greater than suction pressure to each of said bearings;
    at least one region at suction pressure associated with each of said bearings;
    means for providing buffer gas at a pressure greater than suction pressure between each of said bearings and said at least one region at suction pressure associated with each of said bearings;
    means at suction pressure located between each of said bearings and said means for providing buffer gas associated with each bearing for draining lubricant and buffer gas;
    means for providing a seal between each one of said means at suction pressure and a corresponding means for providing buffer gas; and
    means for providing a seal between each of said regions at suction pressure associated with said bearings and a corresponding means for providing buffer gas.

2. The lubrication system of claim 1 where said means for providing a seal include labyrinth seals.

3. A method of lubricating bearings at the inlet end of a screw compressor comprising the steps of:
    supplying lubricant to the inlet side bearings of the screw compressor at a pressure above suction pressure;
    supplying buffer gas at a pressure above suction pressure between each of the inlet side bearings and adjacent regions at suction pressure;
    locating a drain to suction between the supplied buffer gas and each of the corresponding bearings.

4. The method of claim 3 further including the step of providing a seal between the supplied buffer gas and the corresponding drain.

5. The method of claim 4 further including the step of providing a seal between the supplied buffer gas and suction.

\* \* \* \* \*